UNITED STATES PATENT OFFICE.

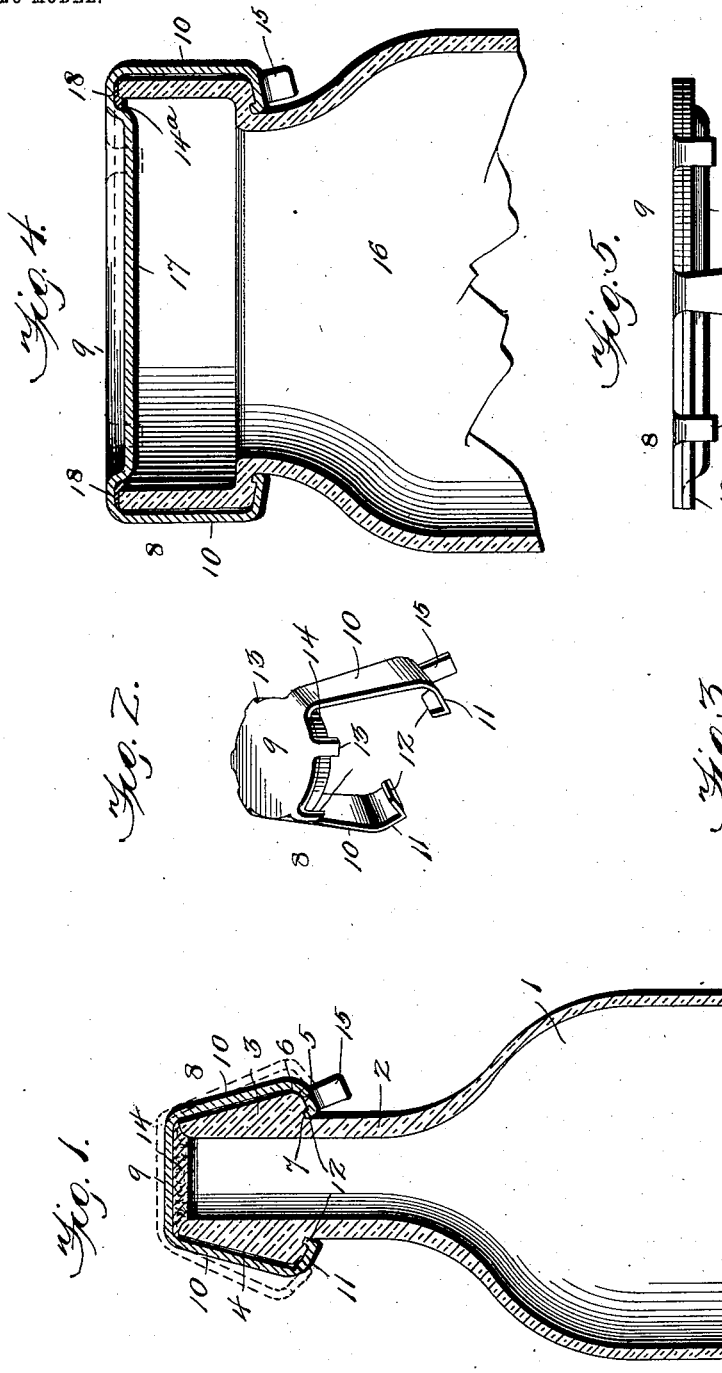

EDWARD P. COOKE, OF BALTIMORE, MARYLAND.

VESSEL-SEAL.

SPECIFICATION forming part of Letters Patent No. 723,515, dated March 24, 1903.

Application filed December 17, 1901. Serial No. 86,301. (No model.)

*To all whom it may concern:*

Be it known that I, EDWARD P. COOKE, a citizen of the United States, residing at Baltimore, in the State of Maryland, have invented certain new and useful Improvements in Vessel-Seals, of which the following is a specification.

This invention relates to vessel seals or closures, and has special reference to an improved seal or closure of this type possessing special utility as a compression closure for bottles, jars, and analogous vessels.

To this end the invention contemplates a seal capable of seating the sealing member or element under great pressure with a minimum effort or applied force, whereby a thoroughly liquid and air tight seal is effected. In carrying out this object the invention has in view the provision of means whereby a positive mechanical force may be utilized to secure the sealing pressure or compression in contradistinction to a spring or equivalent action, which is very commonly resorted to for fastening and pressing into place the corks or other seals for bottles and the like. In such spring-fasteners where it is necessary to provide a strong compression a very considerable effort or applied force is necessary in forcing the spring-fastener in a locked position, as well as in releasing or disengaging the same from the vessel.

To obviate the objections to the ordinary vessel-seals involving the use of spring and equivalent fasteners, the present invention primarily contemplates the use of a pressure-clamp coöperating with a wedging incline or shoulder, thus making use of the mechanical principle or force of the inclined plane or wedge and exerting this force in a direction to tightly compress the sealing member or element upon its seat.

The invention also has in view the provision of simple and effective locking means for preventing the displacement of the pressure-clamp or the sealing member carried thereby.

With these and many other objects in view, which will more readily appear as the nature of the invention is better understood, the same consists in the novel construction, combination, and arrangement of parts hereinafter more fully described, illustrated, and claimed.

The essential features of the invention involved in the coöperation of a pressure-clamp with a wedging incline or shoulder is necessarily susceptible to modification without departing from the spirit of the invention; but the preferred embodiments of the latter are shown in the accompanying drawings, in which—

Figure 1 is a sectional view of a portion of a beer or similar bottle equipped with a pressure-seal constructed in accordance with the present invention. Fig. 2 is a detail perspective view of the form of seal shown in Fig. 1. Fig. 3 is a plan view of the blank of the form of seal shown in Figs. 1 and 2. Fig. 4 is a sectional view showing the invention modified for use upon a fruit-jar or similar vessel. Fig. 5 is a detail elevation of the form of seal shown in Fig. 4.

Like numerals of reference designate corresponding parts in the several figures of the drawings.

In carrying out the invention any type of vessel or receptacle may necessarily be modified at the neck portion thereof to permit of the employment of a pressure-clamp such as is contemplated by the present invention; but the device possesses special utility in connection with beer-bottles and the like and also with fruit-jars and large-mouthed bottles, so for illustrative purposes it has been deemed sufficient to show in the drawings the invention as applied respectively to a beer or similar bottle and also to a fruit-jar.

Reference will first be made to the application of the invention shown in Fig. 1 of the drawings, especially as the seal is peculiarly useful as a closure for beer and other bottles containing fermented liquids or highly-carbonated beverages which necessarily require to be very tightly sealed in a thoroughly air and liquid tight manner.

In Fig. 1 of the drawings the vessel (designated by the numeral 1) is of the general configuration of a beer-bottle, having the usual neck 2, provided contiguous to the mouth thereof with the thickened reinforced collar 3. In bottles of this type the thickened reinforced collar 3 usually is formed with a circumferential exterior inclined surface 4; but in the present invention this surface performs no part whatever in the sealing action of the device and is therefore a mere incident to the formation of the bottle-neck. However, an important feature of the invention resides in providing the bottle-neck upon the exterior thereof with an inclined wedging-shoulder 5, whose incline may be said to be downwardly convergent. This wedging-shoulder in the construction shown in Fig. 1 of the drawings is located under and at the lower end of the main collar portion 3 of the neck, and while annularly encircling the neck may be properly said to be disposed radially to the longitudinal axis or center of the vessel, whereby a lateral pressure or movement is necessary to carry the pressure elements over the inclined surface of the said shoulder 5. The wedging-shoulder 5 is therefore arranged below the plane of the top or mouth of the bottle-neck and preferably at the bottom of the neck portion proper. The incline of the shoulder 5 may be at any angle found suitable for the purpose or according to the degree of pressure which it is desired to exert upon the sealing member. In the construction being described the said shoulder is inclined at an angle of about thirty degrees and at its outer edge is preferably rounded, as at 6, to form guiding-corners which facilitate a quick engagement therewith of the pressure members to be described. At the inner edge or base of the inclined shoulder 5 the vessel-neck is provided with an annular upwardly-disposed lock-groove 7, which may be in approximate parallelism to the axis of the vessel. These elements of the bottle-neck coöperate with the pressure-clamp 8, constituting the seal-fastening member. The pressure-clamp is preferably stamped as an entirety from a single piece of sheet metal. Any suitable non-pliable metal possessing considerable stiffness and strength, such as sheet-steel or the like, can be employed for this purpose, although it is preferable that the metal body of the pressure-clamp have sufficient resiliency to permit of the locking action to be presently referred to. In stamping the pressure-clamp from its blank the same is formed with a top cap portion 9, which is usually circular and fits over the top or mouth of the vessel, and at diametrically opposite sides of the top cap portion 9 the blank is formed with the oppositely-arranged stiff pendent locking-arms 10. These locking-arms 10 are preferably of a downwardly-flaring width to provide a maximum locking area and are formed at their lower ends with inturned substantially rigid pressure-flanges 11, adapted to ride upon the inclined wedging-shoulder 5 and formed at their innermost terminals with upturned catch-lugs 12, which are designed to become engaged with the annular upwardly-disposed lock-groove 7 of the bottle-neck. In addition to the elements described the top cap portion 9 of the pressure-clamp has bent from the edges thereof a plurality of downwardly-extending retaining-prongs 13. These retaining-prongs provide a well-defined seat at the top of the pressure-clamp, within which is placed the sealing member 14, which may consist of a disk of cork, rubber, composition, or other material. The said prongs 13 therefore serve to prevent displacement of the disk 14 and are also sufficiently long to engage the outer edges of the vessel-mouth to positively prevent lateral displacement of the pressure-clamp itself. In using the pressure-clamp the same is simply placed over the top of the bottle-neck, with the sealing member or disk 14 covering the mouth thereof. The side locking-arms 10 will then occupy substantially the position indicated by dotted lines in Fig. 1 of the drawings, with the inner terminals of the pressure-flanges 11 located at the outer edge of the wedging-shoulder 5. By then exerting a lateral inward pressure upon the locking-arms 10 the stiff pressure-flanges 11 are carried over and under the wedging-shoulder 5, with the consequence of exerting a downward pressure or pull upon the top portion of the clamp. This downward pressure causes a tight seating of the seal under great compression. When the inner terminals of the pressure-flanges 11 reach the groove 7, the catch-lugs 12 snap into engagement with such groove and hold the clamp firmly in a locked position under pressure. There is preferably sufficient resiliency in the locking-arms 10 to permit them to resume the positions indicated in dotted lines in Fig. 1, when the catch-lugs are forced out of engagement with the groove 7. It is preferable in constructing the pressure-clamp to provide one or both of the side arms at the lower end thereof with an integral downturned releasing hook or finger 15, under which may be inserted the blade of a knife, pencil, or other convenient object for disengaging the clamp from its locked position, thus dispensing with the use of a special tool for the purpose.

In adapting the invention to a fruit-jar 16, such as shown in Fig. 4 of the drawings, no substantial change is made in the invention itself. The only structural change preferably resorted to is in providing the top cap portion 9 with a central depression 17, fitting inside of the vessel-mouth and producing an interior annular seat 18, within which is fitted the sealing member 14ª in the form of a ring or packing-gasket, designed to be compressed upon the top edge of the vessel-mouth. In other respects the construction and action of the pressure-clamp is the same as that already described. In the formation of the jar or vessel the wedging-shoulder may be formed by swelling the glass at the top, and the incline of the shoulder 5 may be less acute or gradual, as large vessels or jars are usually not required to stand so much pressure as those of the beer-bottle type.

From the foregoing it is thought that the construction, action, and many advantages of the herein-described vessel-seal will be readily apparent without further description, and it will be understood that various changes in the form, proportion, and minor details of construction may be resorted to without departing from the spirit or sacrificing any of the advantages of the invention.

Having thus described the invention, what is claimed, and desired to be secured by Letters Patent, is—

1. In a vessel-seal, the combination of a vessel provided with an exterior downwardly-convergent inclined wedging-shoulder, disposed substantially radial to the neck, and a locking element, a stiff non-pliable pressure-clamp carrying at the top a sealing element, and provided at the bottom with substantially rigid inturned pressure members adapted to bear against the inclined shoulder and be forced downwardly and inwardly thereover by lateral pressure, said pressure members being provided with locking elements having a snapping interlocking engagement with the locking element of the vessel-neck, substantially as set forth.

2. In a vessel-seal, the combination of a vessel provided upon the exterior of its neck with an inclined downwardly-convergent wedging-shoulder, and at the base of said shoulder disposed substantially radial to the neck with a separate upwardly-disposed groove or notch, and a pressure-clamp carrying at the top a sealing element or disk and having pendent locking-arms provided at their lower ends with substantially rigid inturned pressure-flanges having at their inner terminals upturned catch-lugs for snapping engagement with said groove or notch, said pressure-flanges being adapted to bear against the shoulder and to be forced downwardly and inwardly thereover by lateral pressure.

In testimony whereof I affix my signature in presence of two witnesses.

EDWARD P. COOKE.

Witnesses:
 THOS. KELL BRADFORD,
 AUG. W. BRADFORD.